Dec. 12, 1967  V. D. MOLITOR  3,357,765
FOOD SERVICE DEVICE

Filed Aug. 2, 1965  3 Sheets-Sheet 1

INVENTOR.
Victor D. Molitor
BY
ATTORNEYS

Dec. 12, 1967   V. D. MOLITOR   3,357,765
FOOD SERVICE DEVICE

Filed Aug. 2, 1965   3 Sheets-Sheet 2

INVENTOR.
Victor D. Molitor
BY Van Valkenburgh & Lowe
ATTORNEYS

Dec. 12, 1967  V. D. MOLITOR  3,357,765
FOOD SERVICE DEVICE

Filed Aug. 2, 1965  3 Sheets-Sheet 3

INVENTOR.
Victor D. Molitor
BY
Van Valkenburgh & Lowe
ATTORNEYS

United States Patent Office 3,357,765
Patented Dec. 12, 1967

3,357,765
FOOD SERVICE DEVICE
Victor D. Molitor, 2829 S. Santa Fe Drive,
Englewood, Colo. 80110
Filed Aug. 2, 1965, Ser. No. 476,574
13 Claims. (Cl. 312—284)

ABSTRACT OF THE DISCLOSURE

A food service cart having a cover for the top which is provided with a lateral flange at each end and having a special notch for engaging an upright support, the latter preferably being offset, which holds the cover in a tilted position. Each notch is L-shaped, with the longer bar of the L normally in horizontal position, and the edge of the flange outwardly from the shorter bar of the L having a lesser depth than the portion of the flange into which the longer bar of the L extends.

---

This invention relates to food service equipment, and more particularly to a food service device in which the food is supported for display, as in containers on a surface, and a cover or shield, preferably transparent, is normally placed over the food but may be tilted to obtain access for removal of or placement of food on the supporting surface. The food service device of this invention may take the form of a cart, which may be wheeled from place to place, or merely a tray, supported by standards or the like in a stationary position, as on a table, as well as other types.

Among the objects of this invention are to provide a novel food service device; to provide such a food service device in which a tray or the like is supported in horizontal position and a cover for the tray, preferably transparent, is also supported in horizontal position; to provide such a device in which the cover is readily placed over the tray or removed therefrom; to provide such a device in which the cover may be tilted to either side; to provide such a device in which the cover is automatically held in the desired tilted position, at either side of the tray; to provide such a device which may be incorporated in a wheeled cart or other type of food service equipment; and to provide such a food service device which is relatively simple in construction but facile and effective in operation.

Additional objects and the novel features of this invention will become apparent from the description which follows, taken in conjunction with the accompanying drawings, in which.

Figure 2:
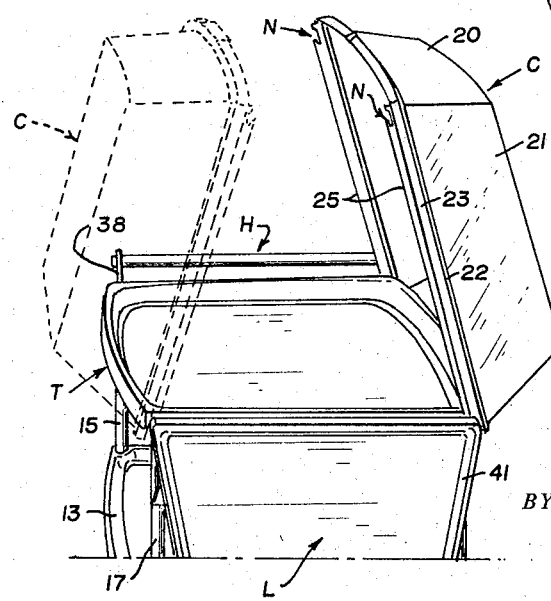
FIG. 2 is a fragmentary, end perspective view of the upper portion of the cart of FIG. 1, but with the shield or cover being tilted upwardly to one side, and the position of the shield or cover, when tilted to the opposite side, being shown in dotted lines.
Figure 9:
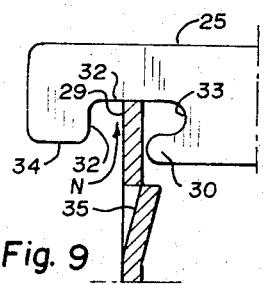
FIG. 9 is a fragmentary, vertical section, taken at one side of the cart through a dimple or indentation in the bracket corresponding to any of the brackets shown in FIGS. 6, 7 and 8, and also showing a portion of a depending flange of the cover when the cover is in horizontal position.
Figure 10:
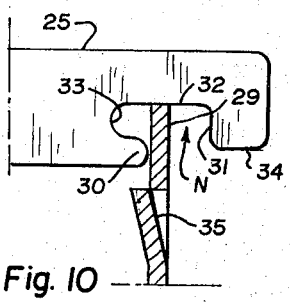
FIG. 10 is a fragmentary, enlarged vertical section, similar to FIG. 9, but taken at the opposite side of the cart.
Figure 11:
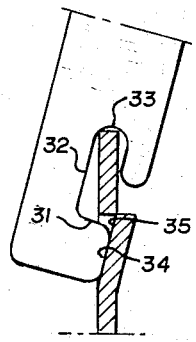
Figure 12:
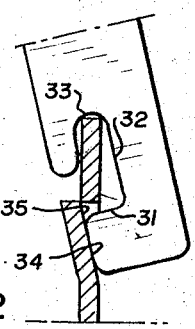

FIG. 11 is a fragmentary, vertical section, on an enlarged scale, taken at the same position as FIG. 9, but showing the position of the parts when the cover is raised to a tilted position on that side, such as the dotted position of FIG. 2; and FIG. 12 is a fragmentary, vertical section, on an enlarged scale and taken from the same position as FIG. 10, but showing the position of the parts when the cover is tilted on the opposite side of the cart, as to the full position of FIG. 2.

Figure 1:
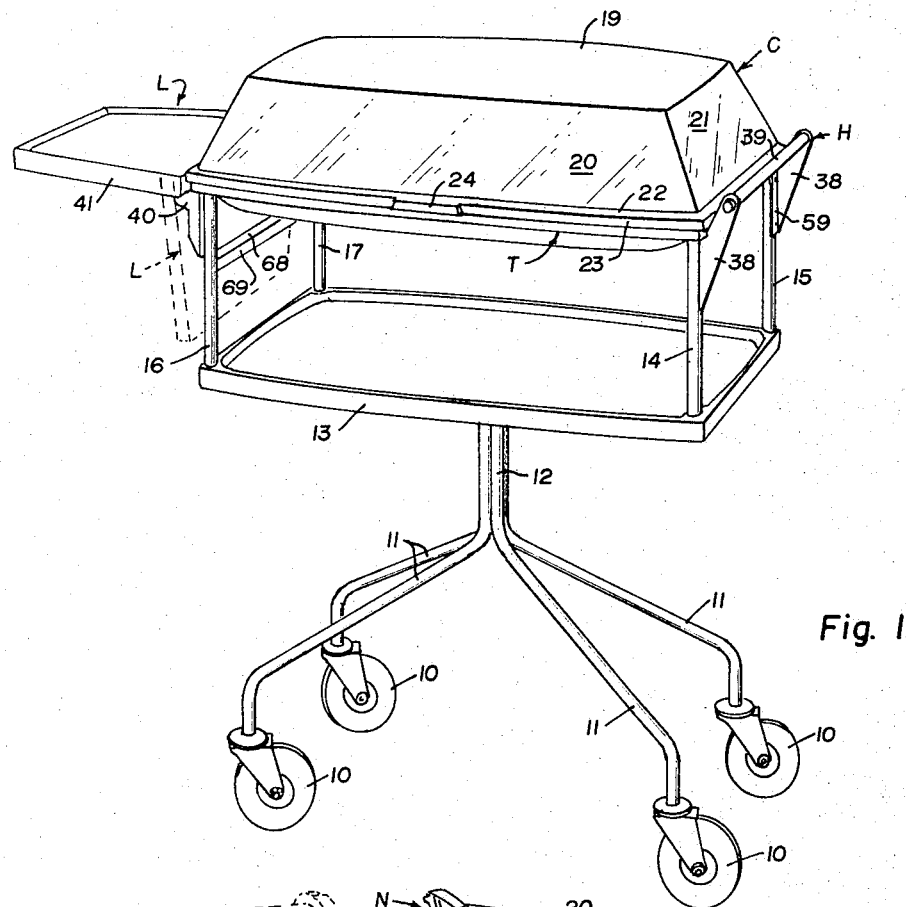
FIG. 1 is a side perspective view of a wheeled cart embodying a food service device constructed in accordance with this invention, with a shield or cover for an upper tray of the cart being shown in a horizontal or closed position.

As in FIGS. 1 and 2, the principles of this invention may be applied to a cart supported for movement by a series of caster wheels 10, attached to the lower ends of divergent legs 11, the divergence of the legs 11 conveniently corresponding to the diagonals of a rectangle, with the legs above the divergence being attached together, as by welding, to form a center post 12. The legs 11 may be formed of either rod or tubing and, at the upper end of center post 12, again diverge in the same pattern as below the center post, but in a horizontal plane, to support a lower tray 13 which is generally rectangular, but has outwardly cambered sides and ends. At the four corners of the lower tray 13, the legs extend vertically to provide corner posts 14 and 15, at one end, and corner posts 16 and 17, respectively, at the opposite end, the lower tray 13 conveniently having a hole at each corner, through which the respective corner post extends, although it may be mounted or supported in any other suitable manner. The cart, as shown, is constructed as in my U.S. design patent D. 191,393. Corner posts 14 and 15 are at the end of the cart at which a handle structure H is mounted, while corner posts 16 and 17 are at the opposite end of the cart, at which a drop leaf structure L is mounted, the drop leaf being movable between the horizontal or upper position shown in full and the lower or dropped position shown in dotted lines in FIG. 1.

In accordance with this invention, the brackets which support either the handle H or the drop leaf L also support an upper tray T and a shield or cover C, which is preferably transparent, such as being formed of plastic, so that the food items placed on the upper tray T can be observed through the transparent cover. Cover C may be formed of an acrylic resin, such as methyl methacrate, or other suitable plastic. The lower tray 13 is adapted to support clean dishes, on which the food selected, as by a patron of a restaurant or the like, is transferred from the food containers on upper tray T. The drop leaf L is adapted to be utilized as a support for the dishes, when food is being removed from the containers on the upper tray T, just prior to being served to the patron. The cover C provides protection against contamination, not only during storage or during movement through a crowded restaurant, but also through sneezing, coughing or the like, by the patron or patrons making a food selection. Thus, the cover C will normally remain in the closed, horizontal position shown in FIG. 1, until the selection is made by the patron or patrons. Depending upon the location of the patron or patrons selecting the food supported by the upper tray T, the waiter can lift the cover C to the full position of FIG. 2, if the patrons are on that side, or to the dotted position of FIG. 2, if the patrons are at the opposite side of the cart, so that at no time will the food remaining on the tray be exposed to possible contaminating activities of the patron making a selection. After the waiter has served the patrons with the food selected, the cover may be closed and the cart wheeled to the next position.

The cover C, as shown, is provided with a generally flat but upwardly convex top 19 and also flat but outwardly convex sides 20 and ends 21. The lower edge of each side and end of the cover C is provided with a sloping, outwardly extending, lateral flange 22 and a downwardly extending depending flange 23, conveniently integral with the cover. At the center of each side, an outwardly extending portion 24 of the depending flange 23 forms a handle for tipping the cover to the position shown. Of course, the cover may be constructed in the manner disclosed in my U.S. design patent D. 187,695, but with a depending flange corresponding to flange 23, or in any other suitable manner. Of course, other shapes and configurations of the cover may be utilized.

Figure 5:
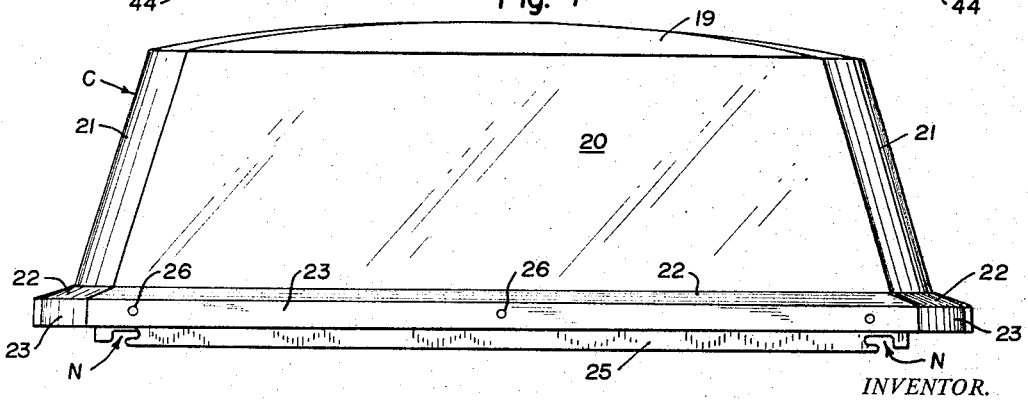
FIG. 5 is an end elevation, on a further enlarged scale, of the shield or cover utilized on both the cart of FIGS. 1 and 2 and the food service device of FIG. 3.

In accordance with this invention, each end of cover C, as in FIG. 5, is provided with a depending flange, such as formed by a metal strip 25 attached to each end of flange 23, as by rivets 26, and may be provided with a decorative coloring and to blend therewith, the lateral flanges 22 and depending flanges 23 of the cover C may be coated or painted in a similar color or with a similar decorative motif. Each strip 25 is provided with a notch N adjacent each end for cooperation with a flange 27 of the bracket of FIG. 6, or a flange 28 of the bracket of FIG. 7, or a flange 29 of a bracket B of FIG. 8, in the manner illustrated in FIGS. 9–12. This cooperation is shown in connection with flange 29 and a corresponding but laterally opposite flange 29' of bracket B, but it will be understood that it is identical with flanges 27 or 28. As in FIGS. 9 and 10, each notch N is provided with an upstanding notch portion between the outer end of a lip 30 and an outer edge 31, extending upwardly to an upper edge 32, and a lateral notch portion 33 above lip 30. Each lateral portion 33 extends toward the opposite notch, while the lower edge 34 of strip 25, outwardly of notch N, preferably is higher than the lower edge of lip 30. Each flange 29 and 29', as well as each flange 27 and 28, is preferably provided on the outside with a dimple 35, conveniently formed by punching a width of metal, greater than the thickness of strip 25 and relatively short in length, inwardly from and partially or almost through the flange at the top of the dimple, for a purpose described below. It will be understood that there will not only be flanges 29 and 29' at one end of the cart, as in FIGS. 9 and 10, but also corresponding flanges at the opposite end of the cart, so that the cover C, in horizontal position, will be supported by the four flanges, as in FIGS. 9 and 10. Due to the spacing between lip 30 and outer edge 31 of each notch N, there is sufficient space that the cover may be readily placed upon or removed from flanges 29 and 29', with the upper edge 32 of the notches resting on the upper ends of flanges 29 and 29'. When the cover is lifted and tipped to the dotted position of FIG. 2, the upper edge 32 of each notch N on that side, will slide on the top of flange 29 and the flange will enter the lateral portion 32 of the notch until the upper end of flange 29 engages the inner end of lateral portion 32, as in FIG. 11. At the same time, lower edge 34 of the strip will abut the inner surface of dimple 35, so that the cover will be supported by the inner end of lateral portion 32 of the notch and also will be steadied by the abutment of edge 34 against dimple 35, since longitudinal displacement of the cover will be prevented by edge 34 and the edges of dimple 35, and direct upward, rather than tilting movement, is also prevented. Concomitant with the cooperation of notches N with flanges 29, the cover C should be sufficiently deep that the center of gravity of the cover will be slightly outwardly from the notches N, as in the dotted position of the cover in FIG. 2, to hold the cover in its nearly upright position. As will be evident, if the cover is moved downwardly from this position, the opposite notches N will be in alignment with the opposite flanges 29' and will engage these flanges, as in FIG. 10.

Similarly, if the cover is tilted upwardly from the opposite side to the full position of FIG. 2, the upper edges 32 of notches N on that side will slide along the top of flanges 29' until the upper ends of flange 29 enter lateral portion 33 of the notches and then abutting the inner end of each lateral portion. Also as before, lower outer edge 34 of the strip will enter and engage the inner surface of dimple 35 to lock the cover against both longitudinal and direct upward displacement. Again, the cover may be lowered from the full position of FIG. 2 to the position of FIG. 1 and the opposite notches N will again engage flanges 29 on the opposite side. As will be evident, the flanges 27 and 28 of FIGS. 6 and 7, respectively, as well as the dimples 35 therein, and the other corresponding flanges, will similarly cooperate with notches N.

Figure 8:
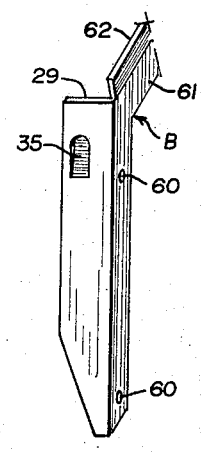
FIG. 8 is a fragmentary, perspective view, on an enlarged scale and similar to a portion of FIG. 6, showing an alternative bracket which may be utilized with the cart of FIG. 1, when neither a handle nor a drop leaf is desired at either or both ends of the cart.

As shown in FIG. 1, the handle structure H includes a bracket having a pair of spaced, longitudinally and upwardly extending arms 38, with a rod 39 extending between the upper ends of the arms. The drop leaf structure L is mounted on a bracket having a pair of spaced, longitudinally extending arms 40 between which drop leaf 41 is pivoted with a conventional double link arrangement (not shown) between the underside of leaf 41 and the bracket, of which arms 40 form a part, these links being connected by a spring, so that when thrown upwardly past center the leaf will not collapse, when weight is placed thereon, but the links can be collapsed by reaching underneath the leaf to drop the leaf to the dotted position of FIG. 1. It will be understood, of course, that a handle structure H may be mounted at each end of the cart, or a drop leaf structure L may be mounted at each end of the cart, or that neither a handle structure nor a drop leaf structure need be provided, but each end of the cart may be provided with a special bracket B, as shown in FIG. 8 and described later, mounted at each end of the cart instead. Or the bracket B of FIG. 8 may be placed at one end of the cart and either the handle structure H or the drop leaf structure L may be placed at the opposite end of the cart.

Figure 3:
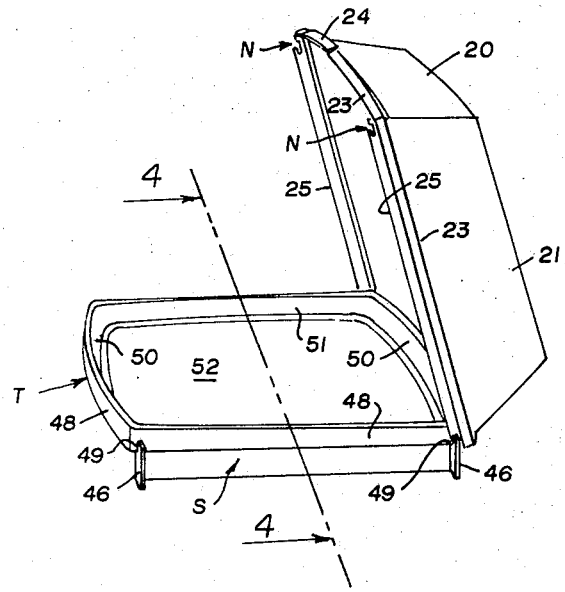
FIG. 3 is an end perspective view of a tray supported by a pair of standards, as on a table, with a shield or cover being associated with the tray in accordance with this invention, the shield or cover being shown as tilted to one side.
Figure 4:
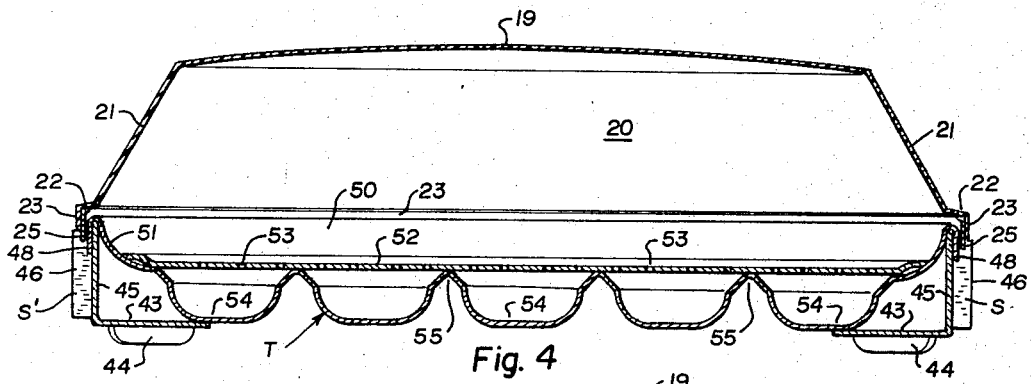
FIG. 4 is a vertical, longitudinal section, on an enlarged scale and taken along line 4—4 of FIG. 3, but with the shield or cover in a horizontal or closed position.

The food service device of FIG. 3 includes a tray T and a cover C, conveniently identical to the upper tray T and cover C of the cart of FIG. 1, supported by a pair of stands S and S', as in FIG. 4. Each stand S and S' may include a base 43, to the underside of which is attached a pair of supporting blocks 44, as of rubber. An upwardly extending rib 45 is connected to or integral with the outer edge of each base 43, while a pair of end flanges 46 and 46', perpendicular to rib 45 and corresponding to flanges 29 and 29' of FIGS. 9–12, extend outwardly therefrom in an endwise direction. Thus, flanges 46 and 46' are provided with dimples 35, in the same manner as flanges 29 and 29'. The periphery of tray T is provided with a rim 48 which, at each end of the tray, fits over rib 45 of the corresponding stand, while each end of rim 48 is provided with a pair of slots 49, as in FIG. 3, to accommodate the corresponding end flanges 46 of the stands. The sides 50 and ends 51 of the tray T curve downwardly and inwardly, as in FIG. 4, while the tray provides support for a plate 52 which in turn provides the actual horizontal surface for supporting the food containers. When the food is to be maintained cool, such as salads, cold meats, certain desserts and the like, a bank of crushed ice may be placed on the plate 52 and the food containers nestled in this crushed ice. For this purpose, the plate 52 is provided with a series of holes 53, so that water resulting from the melting of any of the crushed ice will flow downwardly through the holes, inasmuch as ice floating in water detracts from the appearance of the food displayed in or upon the ice. The water draining from the ice collects in a series of transverse wells 54 separated by ribs 55 which provide additional support for plate 52. Also, the depth of the wells 54 may be so proportioned that the wells at the ends of the tray will rest on the base 43 of the corresponding stand, thus adding additional stability to the stand. Of course, any other tray construction, having a rim adapted to fit over ribs 45 of the stands, to support the tray, may be utilized. The tray T, as well as lower tray 13 and plate 44, may be formed, as by molding or vacuum forming from sheet, of a suitable plastic, such as A.B.S. i.e. an acrylonitrile butadiene styrene copolymer, polyethylene, polypropylene or high impact poly-styrene.

Figure 6:
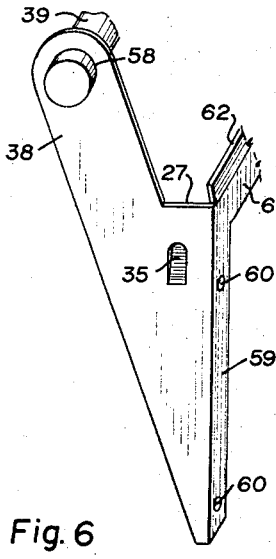
FIG. 6 is a fragmentary, perspective view, on an enlarged scale, of a supporting bracket of a handle assembly, shown at one end of the cart of FIG. 1.

The bracket of the handle structure H, as in FIG. 6, includes flange 27 having dimple 35 and arm 38 at each end, with arm 38 having a hole 58 in the upper end thereof for reception of rod 39 and a vertical rib 59 being disposed perpendicularly to flange 27 and extending downwardly along post 15, rib 59 being provided with holes 60 for attachment to post 15 by bolts. A similar rib 59, extending perpendicularly to the flange 27 on the opposite side of the bracket, extends downwardly along post 14 and is attached thereto in a similar manner. The vertical ribs 59 are connected at their upper ends by a transverse rib 61, along the upper end of which is a transverse flange 62, which fits within the depending rim 48 of tray T, to support the latter at the end at which the handle structure H is positioned. The flange 62 is preferably inclined outwardly, to correspond to the inclination, at that point, of ends 51 of the tray T and to guide the tray accurately into position, when it is placed on the cart. It will be understood, of course, that the stands S and S' of FIG. 4 may be moved along the surface on which they rest, so that a similar guiding action of the upper end of rib 45 is unnecessary, in the case of the construction shown in FIG. 4. The slots 49 in the ends of the rim of tray T receive the upper ends of the flanges 27 of the bracket of FIG. 6, inwardly from dimples 35. When the tray and cover are utilized on a cart, the tray itself, through engagement of its rim at each end with the outturned supporting flanges, reinforces the supporting posts and assists in maintaining the supporting brackets in a correct position for receiving the depending flange at each end of the cover and particularly the notches therein, so that no accuracy in assembly is required, and the depending flanges of the cover will be positioned in alignment with the dimples in the supporting flanges.

Figure 7:
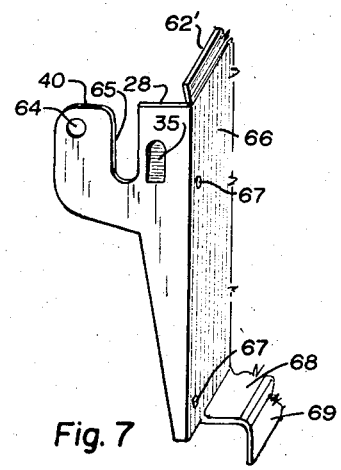
FIG. 7 is a fragmentary, perspective view, on an enlarged scale, of a supporting bracket of a drop leaf assembly, shown at the opposite end of the cart of FIG. 1.

The bracket of the drop leaf structure L, as shown in FIG. 7, includes flange 28 having dimple 35 therein and arm 40 having a hole 64 for reception of pivot pins for the leaf 28, the flange 28 and arm 48 being separated by a notch 65 which receives a reinforcing flange at the inner end of leaf 28 (not shown), when the leaf is moved to the upper or full position of FIG. 1. The bracket of FIG. 7 also includes an upright wall 66, which extends transversely between flange 28 and the corresponding portion on the opposite side of the bracket, and is provided with holes 67 for attachment of the bracket to post 16 of FIG. 1, as by bolts, and similar holes at the opposite side for attachment to post 17. At the upper end of wall 66, a transverse flange 62', similar to flange 62 of FIG. 6, is inclined outwardly to correspond to the inclination of the corresponding end 51 of the tray T and guide the tray into position, when it is being placed on the cart, in a manner similar to flange 62 of FIG. 6. In addition, the bracket of FIG. 7 includes a lower transverse rib 68, which extends inwardly from the lower end of wall 66 and between posts 16 and 17, rib 68 having a depending flange 69 disposed between the posts, as in FIG. 1. It will be understood, of course, that the opposite side of the bracket of FIG. 7 is similarly constructed, but in a complementary manner, to the side shown.

The bracket B of FIG. 8 is similar in many respects to the bracket of FIG. 6, having a vertical rib 59 provided with holes 60 for attachment to one of the posts 14, 15, 16 or 17, as by bolts, and an upper transverse rib 61 for connection with a corresponding vertical rib 59 at the opposite side of the bracket, as well as an upper transverse flange 62, which may be made identical with and utilized for the same purpose as the outwardly inclined flange 62 of the bracket of FIG. 6. As will be evident, the brackets of FIGS. 6, 7 and 8 are interchangeable, for attachment to the posts 14 and 15 at one end of the cart of FIG. 1, or for attachment to the posts 16 and 17 at the opposite end of the cart of FIG. 1. Through the upper flange 62 of the brackets of FIGS. 6 and 8 and the similar upper flange 62' of the bracket of FIG. 7, the tray T may be readily placed on the cart, being guided into position by the flanges 62 or 62', irrespective of which bracket is attached to either end of the cart.

From the foregoing, it will be evident that the requirements and objects hereinbefore set forth have been fulfilled to a marked degree. Through the cooperation of the notches N with the flanges 27, 28 or 29, the cover C not only may be placed on or removed from the cart with ease, but also may be tipped to a tilted position to either side, without any adjustment of any part or changing the position of any other part merely by lifting the cover from the side opposite that on which the cover is to be tilted. Furthermore, due to the cooperation between the dimple 35 and the lower edge of the flange strip, outwardly from the notch, the cover is held securely in the tilted position against both longitudinal and vertical displacement. Thus, if the cover should accidentally be dislodged from its tilted position, it will merely be moved downwardly to the horizontal position and cannot fall off the cart. Through the provision of a pair of longitudinally extending, upright members, such as flanges, with a tray supported by a flange or rib extending transversely between the longitudinal flanges, both a tray and cover may be placed on the same support, irrespective of whether the support is formed by brackets attached to a cart, or by stands placed on a supporting surface, such as a table.

Although preferred embodiments of this invention have been described and shown and variations in the supporting structure have also been described and shown, it will also be understood that other embodiments may exist and that various changes and variations may be made, all without departing from the spirit and scope of this invention.

What is claimed is:

1. A food service device and the like, comprising:
    means providing a horizontal surface for supporting food containers or the like, said surface having sides and ends forming corners;
    means for supporting said surface means and including an upright member adjacent each corner of said surface and extending longitudinally therefrom; and
    a cover for said surface having depending, lateral flange means at each end normally intersecting each upright member at the corresponding end of said surface, said lateral flange means being provided with notch means engaging said upright members for supporting said cover in horizontal position over said surface and also in a position tilted to either side.

2. A food service device and the like, as defined in claim 1, wherein said supporting means comprises a wheeled cart and said upright members at one end of said surface are part of a bracket for attaching a handle to said cart.

3. A food service device and the like, as defined in claim 1, wherein said supporting means comprises a wheeled cart and said upright members at one end of said surface are part of a bracket for attaching a drop leaf to the corresponding end of said cart.

4. A food service device and the like, as defined in claim 1, wherein said upright members are part of a support for a tray having a peripheral rim and said support is provided with an upstanding lateral flange fitting within said rim at each end of said tray.

5. A food service device and the like, comprising:
means providing a horizontal surface for supporting food containers and the like, said surface having sides and ends forming corners;
means for supporting said surface means and including an upright flange at each corner of said surface and extending longitudinally therefrom; and
a cover for said surface having a depending, lateral flange at each end normally intersecting both said upright flanges at the corresponding end of said surface, each said depending flange having a notch corresponding in position to an upright flange, each notch having an upwardly extending portion for receiving said flange, so that said cover may be placed in horizontal position over said surface with said portion of each notch engaging an upright flange, and each notch having a lateral portion within said depending flange and extending toward the opposite notch on the same depending flange, so that said cover may be tilted upwardly to either side of said surface and each said upright flange on that side will extend into said lateral portion to engage the inner end of said lateral portion and the outside of said upright flange will be engaged by the lower, outer corner of said notch.

6. A food service device and the like, as defined in claim 5, wherein said cover is concave on the underside and has sufficient depth that the center of gravity of said cover will be outside the vertical plane of said supporting notches, when said cover is tipped to either side until said upright flanges on that side enter the lateral portions of the corresponding notches.

7. A food service device, as defined in claim 5, wherein the width of the upright portion of each said notch is greater than the vertical depth of the lateral portion of said notch.

8. A food service device, as defined in claim 5, wherein the depth of each said notch is greater at the inner edge than at the outer edge of said upright portion.

9. A food service device, as defined in claim 5, wherein each said upright flange is provided with a dimple on the outside thereof for receiving the edge of said cover flange outwardly of said notch when said cover is tilted to that side, to secure said cover in said tilted position.

10. A food service device, as defined in claim 5, wherein:
the width of the upright portion of each said notch is greater than the vertical depth of the lateral portion of said notch;
the depth of each said notch is greater at the inner edge than at the outer edge of said upright portion; and
each said upright flange is provided with a dimple on the outside thereof for receiving the edge of said cover flange outwardly of said notch when said cover is tilted to that side.

11. A food service device comprising:
a substantially rectangular, horizontal food retaining tray having a peripheral, downturned rim;
support means for tray including a transverse member engaging the underside of said rim at each end of said tray and a pair of laterally spaced, upright members at each end of and extending longitudinally beyond the end of said tray; and
a cover for said tray supported by each of said members when in horizontal position above said tray and by said members at either side of said tray when tilted to a position above but to the side of said tray.

12. A food service device comprising:
a substantially rectangular, food retaining tray having a peripheral, downturned rim;
a support for the tray having a narrow, upright longitudinally outstanding member adjacent each corner at each end of the tray;
a convex cover proportioned to cover the tray, including a depending peripheral flange adapted to encompass the rim of the tray when set into position over the tray and notch means at each corner receiving the top edge of one of said members when the cover is placed over the tray, and with the upper edge of said members at one side of the tray functioning as an axis for pivoting said cover to said side and said notch functioning as a socket to hold the cover in said position.

13. A food service device and the like, comprising:
means providing a horizontal surface for supporting food containers or the like, said surface having sides and ends forming corners;
means for supporting said surface means and including an upright member adjacent each corner of said surface and extending longitudinally therefrom; and
a cover for said surface having depending, lateral flange means at each end normally intersecting each upright member at the corresponding end of said surface, said lateral flange means being provided with notch means engaging said upright members for supporting said cover in horizontal position over said surface and also in a position tilted to either side, as well as permitting removal of said cover by upward movement thereof from said horizontal position.

References Cited

UNITED STATES PATENTS

| 600,318 | 3/1898 | Pletcher | 16—147 |
| 1,318,387 | 10/1919 | Keevil | 108—78 |
| 1,842,603 | 1/1932 | Gray | 220—31 |
| 1,888,649 | 11/1932 | Anderson | 108—27 |
| 2,678,864 | 5/1954 | Louis | 312—127 X |
| 3,020,113 | 2/1962 | Molitor | 312—284 |

FOREIGN PATENTS 207,701 11/1939 Switzerland.

BOBBY R. GAY, *Primary Examiner.*

JAMES T. McCALL, *Examiner.*